(12) United States Patent
Siew et al.

(10) Patent No.: US 8,458,559 B2
(45) Date of Patent: Jun. 4, 2013

(54) METHOD AND APPARATUS FOR ENCODING AND DECODING

(75) Inventors: Jiun Siew, Mulgrave (AU); Phong Nguyen, Mulgrave (AU)

(73) Assignee: NEC Corporation, Tokyo (JP)

( * ) Notice: Subject to any disclaimer, the term of this patent is extended or adjusted under 35 U.S.C. 154(b) by 170 days.

(21) Appl. No.: 13/125,463

(22) PCT Filed: Dec. 25, 2009

(86) PCT No.: PCT/JP2009/071886
§ 371 (c)(1),
(2), (4) Date: Apr. 21, 2011

(87) PCT Pub. No.: WO2010/079728
PCT Pub. Date: Jul. 15, 2010

(65) Prior Publication Data
US 2011/0283171 A1    Nov. 17, 2011

(30) Foreign Application Priority Data

Jan. 9, 2009   (AU) ................................ 2009900063

(51) Int. Cl.
*H03M 13/00* (2006.01)
*G06F 7/02* (2006.01)
*H04H 20/71* (2008.01)
*H04W 4/00* (2009.01)
*H04W 72/00* (2009.01)

(52) U.S. Cl.
USPC ....... 714/758; 714/821; 455/3.01; 455/422.1; 455/426.2; 455/450; 370/329

(58) Field of Classification Search
None
See application file for complete search history.

(56) References Cited

U.S. PATENT DOCUMENTS

| | | | |
|---|---|---|---|
| 8,315,225 B2* | 11/2012 | Xu et al. | 370/330 |
| 2011/0096658 A1* | 4/2011 | Yang et al. | 370/210 |
| 2011/0194514 A1* | 8/2011 | Lee et al. | 370/329 |
| 2011/0228732 A1* | 9/2011 | Luo et al. | 370/329 |

OTHER PUBLICATIONS

"3GPP TSG-RAN Working Group 1 #51bis," Tdoc R1-080318, Jan. 14-18, 2008, pp. 1-5.
"3GPP TSG RAN WG1 Meeting #55," R1-084248, Nov. 10-14, 2008, pp. 1-7.

* cited by examiner

*Primary Examiner* — Guerrier Merant
(74) *Attorney, Agent, or Firm* — Sughrue Mion, PLLC

(57) ABSTRACT

A method of encoding a bit sequence over a Physical Downlink Control Channel (PDCCH) having Downlink Control Information (DCI) including: determining DCI bits to provide a DCI bit sequence; performing a CRC calculation on the DCI bit sequence to provide a CRC parity bit sequence; scrambling the CRC parity bit sequence to provide a scrambled CRC bit sequence; if the DCI format is LTE-A, further scrambling the DCI together with the attached scrambled CRC bit sequence to provide a LTE-A scrambled bit sequence; channel coding either the DCI attached scrambled CRC bit sequence or LTE-A scrambled bit sequence to provide a channel coded bit sequence; modulating the channel coded bit sequence to provide a modulated symbol sequence; layer mapping the modulated symbol sequence to one or more antennas associated with a transmitter to provide one or more layers having a symbol sequence; and precoding the layered symbol sequences.

16 Claims, 4 Drawing Sheets

METHOD AND APPARATUS FOR ENCODING AND DECODING

CROSS REFERENCE TO RELATED APPLICATIONS

This application is a National Stage of International Application No. PCT/JP2009/071886 filed Dec. 25, 2009, claiming priority based on Australian Patent Application No. 2009900063 filed Jan. 9, 2009, the contents of all of which are incorporated herein by reference in their entirety.

This application is based upon and claims the benefit of priority from Australian Provisional Patent Application 2009900063, filed on Jan. 9, 2009, the disclosure of which is incorporated herein in its entirety by reference.

TECHNICAL FIELD

The present invention relates to wireless communications systems, and more particularly to a method for encoding and decoding downlink control information over a wireless communications system.

BACKGROUND ART

The Long Term Evolution standard (LTE) is a mobile communication standard which is designed to cope with evolutions in mobile communications technology. Long Term Evolution Advanced (LTE-A) is a recent mobile communication standard which is an enhancement over LTE to utilise wider transmission bandwidth in the aggregated manner.

Under LTE, fast control signalling is achieved by using the Physical Downlink Control Channel (PDCCH) which carries Downlink Control Information (DCI) required by the User Equipment (UE) to adequately receive and decode the transmitted data.

SUMMARY OF INVENTION

DCI formats under LTE-A provide advanced features such as multipoint transmission and advanced spatial multiplexing schemes, but given the control signalling scheme in LTE, LTE-A systems are forced to revert back to LTE which eliminates the possibility of using the advanced features found in LTE-A.

These "backwards compatibility" issues are particularly problematic when subbands in an available spectrum are shared to both LTE-A and LTE UEs.

Therefore, it would be desirable to provide a method and apparatus which includes DCI formats which take advantage of LTE-A. It would further be desirable to have LTE-A DCI formats distinguishable from the existing LTE DCI formats, to minimise any increase of computational demands as a result of using LTE-A DCI formats, and allow the introduction of new DCI formats (for future standardisation processes) to be flexible.

It will be appreciated that a reference herein to any matter which is given as prior art is not to be taken as an admission that that matter was, in Australia or elsewhere, known or that the information it contains was part of the common general knowledge as at the priority date of the claims forming part of this specification.

With this in mind, one aspect of the present invention provides a method of encoding a bit sequence over a Physical Downlink Control Channel (PDCCH) having Downlink Control Information (DCI) including the steps of:

(a) determining DCI bits to provide a DCI bit sequence;

(b) performing a CRC calculation on the DCI bit sequence to provide a CRC parity bit sequence;

(c) scrambling the CRC parity bit sequence to provide a scrambled CRC bit sequence;

(d) if the DCI format is LTE-A, further scrambling the DCI together with the attached scrambled CRC bit sequence to provide a LTE-A scrambled bit sequence;

(e) channel coding either the DCI attached scrambled CRC bit sequence or LTE-A scrambled bit sequence to provide a channel coded bit sequence;

(f) modulating the channel coded bit sequence to provide a modulated symbol sequence;

(g) layer mapping the modulated bit sequence to one or more antennas associated with a transmitter to provide one or more layers having a symbol sequence; and (h) precoding the layered bit sequences.

Preferably, the DCI bit sequence is represented by $a_i$, of length D where the index i ranges from 0 to D−1.

Preferably, CRC parity bit sequence is represented by $p_l$, which has a length of L bits and whose index/ranges from 0 to L−1.

Preferably, scrambling the CRC parity bit sequence includes the steps of:

(a) performing a bitwise modulo-2 summation on the CRC parity bit sequence with a first predetermined sequence; and (b) concatenating the CRC parity bit sequence with the DCI bit sequence to provide the scrambled CRC bit sequence.

Preferably, the modulo two summation is a bitwise XOR operation on the CRC parity bit sequence given by the expression:

$$b_l = (p_l + x_l) \bmod 2 \quad l = 0, 1, \ldots, L-1 \text{ where x is the first predetermined sequence.}$$

Preferably, the first predetermined sequence is the Radio Network Temporary Identifier (RNTI) sequence of 16 bits.

Preferably, the first predetermined sequence is any sequence having the same bit length as the CRC parity bit sequence.

Preferably, the scrambled CRC bit sequence is denoted $c_k$ which is given by:

$$c_k = \begin{cases} a_k & \text{for } k = 0, 1, 2, \ldots, D-1 \\ b_k & \text{for } k = D, D+1, \ldots, D+L \end{cases}$$

and where the length of c is denoted by K=D+L

Preferably, the further scrambling is performed by scrambling the scrambled CRC bit sequence with a second predetermined sequence to provide the LTE-A scrambled bit sequence. Advantageously, this helps to further distinguish between LTE and LTE-A systems.

Preferably, the second predetermined sequence is equal to the total number of bits K.

Preferably, the second predetermined sequence is a repeated version of the RNTI or cell ID bit sequence.

Preferably, if the RNTI sequence is used, the sequence of bits should be manipulated so as not to undo the scrambling of the first stage. Possible methods for this include reversing or permuting the sequence. Advantageously, using the RNTI will provide some additional degree of interference suppression between UEs, thereby potentially improving system performance. Further, the RNTI is a readily available sequence that does not require additional signalling.

In an alternative, using the Cell ID provides some advantages such as providing some degree of interference suppression between UEs in different cells and a readily available sequence that does not require additional signalling.

Preferably, at step (h), the precoding complies with the LTE-A specification when available.

Another aspect of the present invention provides a method of decoding a bit sequence over a PDCCH including:

(a) demodulating and demapping the received symbol sequence to provide a demodulated bit sequence;

(b) channel decoding the demapped bit sequence to provide a channel decoded bit sequence;

(c) if the bit sequence is LTE-A, descrambling the channel decoded bit sequence to provide a LTE-A descrambled bit sequence;

(d) CRC descrambling either the LTE-A descrambled bit sequence or channel decoded bit sequence to provide a DCI bit sequence such that the DCI format is detected.

Preferably, at step (d) CRC descrambling includes the step of:

(a) performing a bitwise modulo-2 summation on the channel decoded bit sequence with a first predetermined sequence.

Preferably, the first predetermined sequence is the RNTI sequence of 16 bits.

Preferably, at step (c), the descrambling is performed by descrambling the channel decoded bit sequence with a second predetermined sequence to provide a LTE-A descrambled bit sequence. Advantageously, this helps to further distinguish between LTE and LTE-A systems.

Preferably, the second predetermined sequence is a repeated version of the RNTI or cell ID bit sequence.

Preferably, if the RNTI sequence is used, the sequence of bits should be manipulated so as not to undo the scrambling of the first stage. Possible methods for this include reversing or permuting the sequence.

A further aspect of the present invention provides an encoder for encoding a bit sequence over a Physical Downlink Control Channel (PDCCH) having Downlink Control Information (DCI) including:

a DCI bit module for providing a DCI bit sequence;

a CRC calculation module for computing a CRC calculation on the DCI bit sequence to provide a CRC parity bit sequence;

a CRC scramble module for scrambling the CRC parity bit sequence to provide a scrambled CRC sequence;

an LTE-A bit scrambler module for further scrambling the scrambled CRC bit sequence to provide a LTE-A scrambled bit sequence if the DCI bit module determined the DCI format to be LTE-A;

a channel coding module for channel encoding the scrambled CRC bit sequence or LTE-A scrambled bit sequence to provide a channel coded bit sequence;

a modulation module for modulating the channel coded bit sequence to provide a modulated bit sequence;

a layer mapping module for modulating the bit sequence to one or more antennas associated with a transmitter to provide one or more layers having a bit sequence; and a precoding module for precoding the layered bit sequences.

Yet another aspect of the present invention provides a decoder for decoding an encoded bit sequence including:

a demodulation and demapping module for demodulating and demapping the symbol sequence to provide a demodulated bit sequence;

a channel decoding module for channel decoding the demapped bit sequence to provide a channel decoded bit sequence;

a LTE-A descrambler module for descrambling the channel decoded bit sequence and provide a LTE-A descrambled bit sequence if the bit sequence is LTE-A;

a CRC descrambler module for CRC descrambling either the LTE-A descrambled bit sequence or channel decoded bit sequence to provide a DCI bit sequence such that the DCI format is detected.

The following description refers in more detail to the various features and steps of the present invention. To facilitate an understanding of the invention, reference is made in the description to the accompanying drawings where the invention is illustrated in a preferred embodiment. It is to be understood however that the invention is not limited to the preferred embodiment illustrated in the drawings.

DESCRIPTION OF EMBODIMENTS

Figure 1:
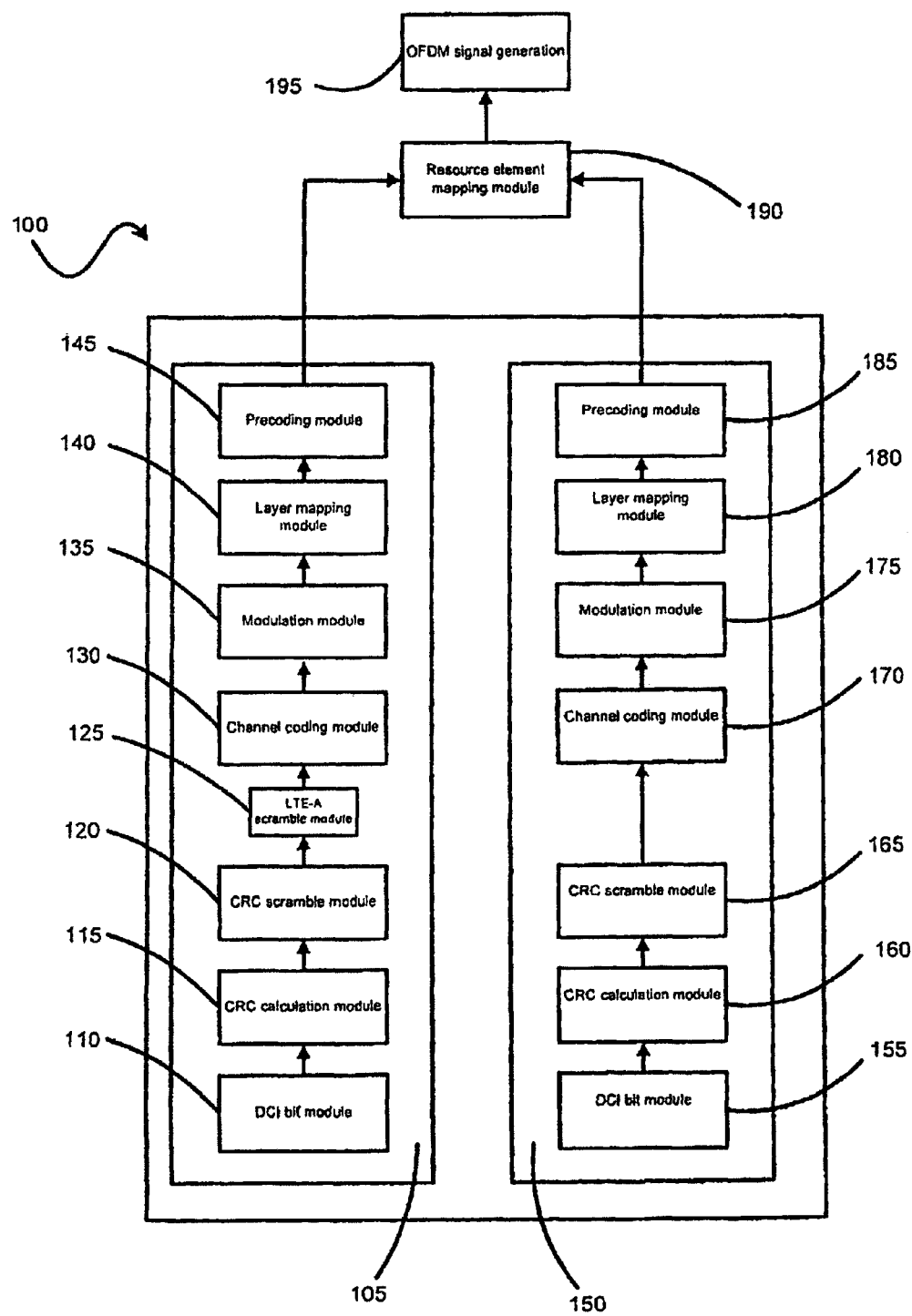
FIG. 1 is a block diagram of the components of an encoder according to an embodiment of the present invention.

Referring now to FIG. 1, there is shown a Physical Downlink Control Channel (PDCCH) encoder 100. The PDCCH encoder 100 includes an LTE-A encoder 105 for LTE-A transmissions and a LTE encoder 150 for LTE transmissions. Once encoded, the output of both the LTE-A encoder 105 and LTE encoder 150 feeds into a resource element mapping component 190 before generating an OFDM signal 195.

The LTE-A encoder 105 and LTE encoder 150 both include a number of identical components in order to encode a bit sequence. However, the LTE-A encoder 105 further includes a LTE-A bit scrambler module which scrambles the bit sequence by a unique LTE-A sequence. Advantageously, this additional step ensures that LTE systems will not be able to decipher any LTE-A information.

The transmitter associated with the PDCCH encoder 100 knows whether or not the receiver (associated with the PDCCH decoder 200 of FIG. 2) it is serving is LTE-A or LTE enabled prior to the encoding sequence via the PDCCH encoder 100. This is typically done when a UE solicits the services of a transmitter/basestation (e.g. when it powers up or when it moves into the geographical area served by the basestation). In an embodiment, there may be a switching module [not shown] where if the transmitter needs to encode a sequence for an LTE-A enabled receiver/UE, it follows the encoding chain with the additional LTE-A specific scrambling as described below. Otherwise, it simply follows the LTE coding sequence.

LTE-A Encoder

The LTE-A encoder 105 includes a DCI bit module 110 which assembles a string of bits that carries information required by the receiver (FIG. 2) for proper demodulation. The DCI may carry information such as resource block assignment, Hybrid Automatic Repeat Request (HARD) information, the modulation and coding scheme, power control information, uplink resource allocation, precoding information, random access information and paging information. In addition, DCI for LTE-A may also contain information such as multipoint transmission modes, relaying information and any other new features that are included in LTE-A as it evolves. The DCI bit module 110 outputs a DCI bit sequence which is received by the CRC calculation module 115. The CRC calculation module 115 calculates the cyclic redundancy check (CRC) parity bits (which are used by the receiver to determine if all the bits have been accurately detected). The CRC calculation module 115 outputs a CRC parity bit sequence to the CRC scramble module 120. The CRC scramble module 120 takes the CRC parity bit sequence output from CRC scramble module 120 and performs a bitwise modulo-2 summation with a first predetermined sequence. The first predetermined sequence can be the same as would be used in LTE Decoder 150, where the Radio Network Temporary Identifier (RNTI) sequence of 16 bits is used. Alternatively, other sequences can be used as the first predetermined sequence provided that they have the same bit length as the CRC parity bit sequence. The CRC scramble module 120 then concatenates the entire CRC parity bit sequence with the DCI block of bits resulting in a scrambled CRC sequence which is output to the LTE-A bit scrambler module 125 for further scrambling.

The LTE-A bit scrambler module 125 further scrambles the scrambled CRC sequence which was output from the CRC scramble module 120 by scrambling again but with a second predetermined sequence. Advantageously, when the entire control bit (DCI) sequence (with CRC attachment) is further scrambled by a unique LTE-A sequence, this further distinguishes between LTE and LTE-A systems. Some possible sequences include the RNTI and cell ID. Any predetermined sequence can be used provided that the length of the second predetermined sequence is equal to the length of the CRC scrambled bit sequence. A possible second predetermined sequence may be a repeated version of the RNTI or cell ID bit sequence. If the RNTI sequence is used, the sequence of bits should be manipulated so as not to undo the scrambling of the first stage. Possible methods for this include reversing or permuting the sequence. The LTE-A bit scrambler module 125 then outputs a LTE-A scrambled bit sequence for output to the channel coding module 130. The channel coding module 130 then codes the LTE-A scrambled bit sequence provided by the LTE-A bit scrambler module 125. Many coding schemes can be used, such as convolutional, block, Reed-Solomon, Turbo etc. Further, the channel coding scheme used in the LTE encoder 150 could be used. Advantageously, re-using the LTE encoder 150 allows for simpler hardware development (reduced chip sizes, and hardware complexity) as LTE encoders are already needed for LTE systems. Once the LTE-A scrambled bit sequence is coded, the channel coding module 130 outputs the channel coded bit sequence to the modulation module 135. The modulation module 135 takes the channel coded bit sequence output from the channel coding module 130 and converts them into complex values to provide a modulated bit sequence. Modulation schemes such as BPSK, QPSK, 16QAM or 64QAM can be used. Preferably, the currently used LTE modulation scheme of QPSK is used. The reason for this is that QPSK provides a trade-off between robustness to adverse channel conditions while providing some throughput gains as two bits are mapped to every complex value. In contrast, while BPSK is more robust it only maps one bit per complex value. On the other hand, 16QAM maps 4 bits and 64QAM maps 6 bits per complex value but both require more benign channel conditions in order to operate adequately. Most importantly, QPSK is used in LTE systems, and re-use in the present invention makes implementation easier. The modulated bit sequence is output to the layer mapping module 140. The layer mapping module 140 takes the modulated bit sequence and maps them to a number of antennas associated with a transmitter thereby providing one or more layers having a bit sequence. The precoding module 145 then precodes the layered bit sequences for output to the resource element mapping module 190. The precoding module modifies each layer of symbols in a specified way. The precoding should comply with the LTE-A specification. Methods such as space frequency block coding or any other form of precoding may be used.

The resource element mapping module 190 receives complex value symbols from the output of precoding module 145 and maps them to a resource element grid according to the LTE-A standard.

The DCI bit module 110 determines DCI bits to provide a DCI bit sequence. The CRC calculation module 115 computes a CRC calculation on the DCI bit sequence to provide a CRC parity bit sequence. The CRC scramble module 120 scrambles the CRC parity bit sequence to provide a scrambled CRC sequence. The LTE-A bit scrambler module 125 scrambles the scrambled CRC bit sequence to provide a LTE-A scrambled bit sequence if the DCI bit module determined the DCI format to be LTE-A. The channel coding module 130 channel encodes the scrambled CRC bit sequence or LTE-A scrambled bit sequence to provide a channel coded bit sequence. The modulation module 135 modulates the channel coded symbol sequence to provide a modulated symbol sequence. The layer mapping module 140 modulates the symbol sequence to one or more antennas associated with a transmitter to provide one or more layers having a symbol sequence. The precoding module 145 precodes the layered symbol sequences.

The DCI bit sequence may be represented by $a_i$, of length D where the index i ranges from 0 to D−1. The CRC parity bit sequence may be represented by $p_l$, which has a length of L bits and whose index l ranges from 0 to L−1. The CRC scramble module 120 may perform a bitwise modulo-2 summation on the CRC parity bit sequence with a first predetermined sequence. The CRC scramble module 120 may concatenate the CRC parity bit sequence with the DCI bit sequence to provide the scrambled CRC bit sequence. The modulo two summation may be a bitwise XOR operation on the CRC parity bit sequence given by the expression:

$$b_l = (p_l + x_l) \bmod 2 \ \ l=0,1,\ldots,L-1 \text{ where x is the first predetermined sequence.}$$

The first predetermined sequence may be the Radio Network Temporary Identifier (RNTI) sequence of 16 bits. The first predetermined sequence may be any sequence having the same bit length as the CRC parity bit sequence. The scrambled CRC bit sequence may be denoted $c_k$ which is given by:

$$c_k = \begin{cases} a_k & \text{for} \ \ k = 0, 1, 2, \ldots, D-1 \\ b_k & \text{for} \ \ k = D, D+1, \ldots, D+L \end{cases}$$

and where the length of c is denoted by K=D+L.

The LTE-A bit scrambler module 125 may scramble the scrambled CRC bit sequence with a second predetermined sequence to provide the LTE-A scrambled bit sequence. The second predetermined sequence may be equal to the total number of bits K. The second predetermined sequence may be a repeated version of the RNTI or cell ID bit sequence. The sequence of RNTI bits may be manipulated so as not to undo the scrambling of the CRC parity bit sequence. The manipulation may include reversing or permuting the sequence. The precoding module 145 may comply with the LTE-A specification when available.

LTE Encoder

The LTE encoder 150 works in the same way as the LTE-A encoder 105 except it omits the LTE-A bit scrambler module 125. The LTE encoder 150 includes a DCI bit module 155 which assembles a string of bits that carries information required by the receiver for proper demodulation. The DCI may only carry LTE information such as resource block assignment, Hybrid Automatic Repeat Request (HARD) information, modulation and coding scheme, power control information, uplink resource allocation, precoding information, random access information and paging information. The DCI bit module 155 outputs a DCI bit sequence which is received by the CRC calculation module 160. The CRC calculation module 160 calculates the cyclic redundancy check (CRC) parity bits (which are used by the receiver to determine if all the bits have been accurately detected). The CRC calculation module 160 outputs a CRC parity bit sequence to the CRC scramble module 165. The CRC scramble module 165 takes the CRC parity bit sequence output from CRC scramble module 165 and performs a bitwise modulo-2 summation with a first predetermined sequence. The first predetermined sequence can be the RNTI sequence of 16 bits. The CRC scramble module 165 then concatenates the entire CRC parity bit sequence with the DCI block of bits resulting in a scrambled CRC bit sequence which is output to the channel coding module 170. The channel coding module 170 then codes the scrambled CRC bit sequence provided by the CRC scramble module 165. Once the scrambled CRC bit sequence is coded, the channel coding module 170 outputs the channel coded bit sequence to the modulation module 175. The modulation module 175 takes the channel coded bit sequence output from the channel coding module 170 and converts them into complex values to provide a modulated symbol sequence. Preferably, the currently used LTE modulation scheme of QPSK is used. The modulated bit sequence is output to the layer mapping module 180. The layer mapping module 180 takes the modulated bit sequence and maps them to a number of antennas associated with a transmitter thereby providing one or more layers having a bit sequence. The precoding module 185 then precodes the layered bit sequences for output to the resource element mapping module 190. The precoding module modifies each layer of symbols in a specified way. Preferably, the precoding should comply with LTE specifications only. Methods such as space frequency block coding or any other form of precoding may be used.

The resource element mapping module 190 receives complex values from the precoding module 185 and maps them to a resource element grid according to the LTE standard.

Figure 2:
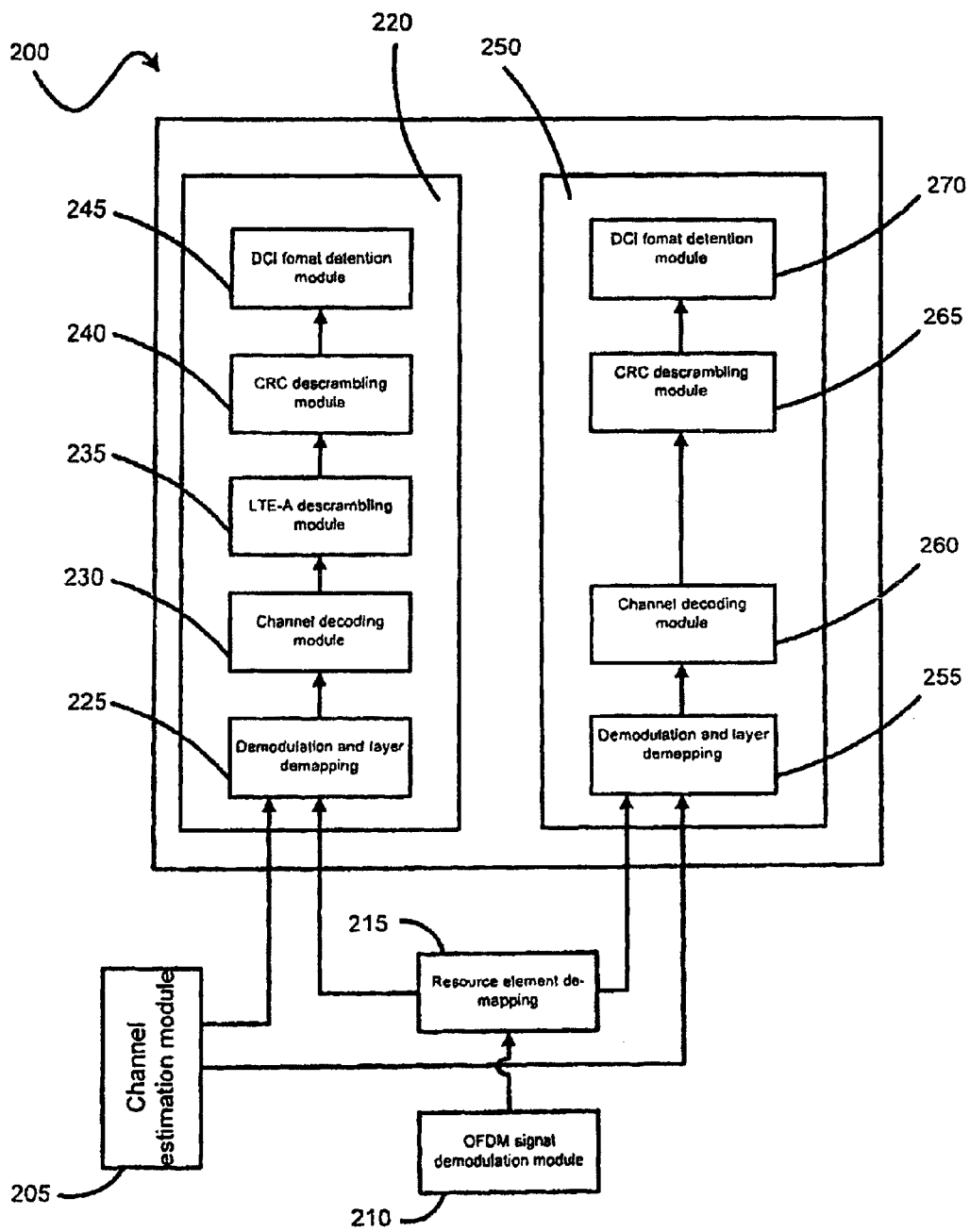
FIG. 2 is a block diagram of the components of a decoder according to an embodiment of the present invention.

Referring now to FIG. 2, there is shown a Physical Downlink Control Channel (PDCCH) decoder 200. The PDCCH decoder 200 includes an LTE-A decoder 220 for LTE-A transmissions and a LTE decoder 250 for LTE transmissions. Before decoding, channel estimation is provided by a channel estimation module 205 and received symbols are provided to the LTE-A decoder 220 or LTE decoder 250 by OFDM signal demodulation module 210 via the resource element demapping module 215.

The LTE-A decoder 220 and LTE decoder 250 both include a number of identical components in order to decode a bit sequence. However, the LTE-A decoder 220 includes a LTE-A bit descrambler module 235 which descrambles the bit sequence by a unique LTE-A sequence. Advantageously, this additional step ensures that LTE systems will not be able to decipher any LTE-A information.

The transmitter associated with the PDCCH decoder 200 knows whether or not the transmitter (associated with the PDCCH encoder 100 of FIG. 1) it is serving is LTE-A or LTE enabled prior to the decoding sequence via the PDCCH decoder 200. This is typically done when a UE solicits the services of a transmitter/basestation (e.g. when it powers up or when it moves into the geographical area served by the basestation). In an embodiment, there may be a switching module [not shown] where if the transmitter needs to decode a sequence for an LTE-A enabled receiver/UE, it follows the decoding chain with the additional LTE-A specific descrambling as described below. Otherwise, it simply follows the LTE decoding sequence.

LTE-A Decoder

The LTE-A decoder 220 includes a demodulation and layer demapping module 225 which takes the received bit sequence output from the resource element demapping module 215 and converts them into a demodulated symbol sequence. The symbol sequence can be demodulated using a variety of methods such as zero forcing, Minimum Mean Squared Error (MMSE), and Maximum Likelihood Detection (MLD) but is dependent on the scheme used at the layer mapping module 140 and precoding module 145 used at the encoder 100 (shown in FIG. 1). The output of the demodulation and layer demapping module 225 is a demodulated bit sequence which is then passed to the channel decoding module 230.

The channel decoding module 230 then decodes the demodulated bit sequence provided by the demodulation and layer demapping module 225. The decoder implementation depends on the coding scheme used at the channel coding module 130 at the LTE-A encoder 105 (shown in FIG. 1). In the event the LTE encoder 150 is used, then the same decoder can be used for LTE-A decoding. The channel decoding module 230 outputs a channel decoded bit sequence for use with the LTE-A descrambling module 235.

The LTE-A descrambling module 235 descrambles the channel decoded bit sequence which was output from the channel decoding module 230 by descrambling according to the LTE-A scrambling module 125 (FIG. 1) of the LTE-A encoder 105 (shown in FIG. 1). Preferably, the same sequence used at the transmitter (FIG. 1) should be used at the receiver (FIG. 2). The LTE-A descrambling module 235 outputs an LTE-A descrambled bit sequence to the CRC descrambling module 240.

The CRC descrambling module 240 takes the CRC bits from the LTE-A descrambled bit sequence output from LTE-A descrambling module 235 and performs a bitwise modulo-2 summation with a first predetermined sequence (this stage of descrambling only operates on the CRC bits). Preferably, the same sequence used at the transmitter (FIG. 1) should be used at the receiver (FIG. 2). The CRC descrambling module 240 then outputs a DCI bit sequence such that the DCI format is detected at the DCI format detection module 245.

The demodulation and layer demapping module 225 demodulates and demaps the received symbol sequence to provide a demodulated bit sequence. The channel decoding module 230 channel decodes the demapped bit sequence to provide a channel decoded bit sequence. The LTE-A bit descrambler module 235 descrambles the channel decoded bit sequence and provide a LTE-A descrambled bit sequence if the bit sequence is an LTE-A sequence. The CRC descrambling module 240 CRC descrambles either the LTE-A descrambled bit sequence or channel decoded bit sequence to provide a DCI bit sequence such that the DCI format is detected.

The CRC descrambling module 240 may perform a bitwise modulo-2 summation on the channel decoded bit sequence with a first predetermined sequence. The first predetermined sequence may be the Radio Network Temporary Identifier (RNTI) sequence of 16 bits. The LTE-A bit descrambler module 235 may descramble the channel decoded bit sequence with a second predetermined sequence to provide a LTE-A descrambled bit sequence. The second predetermined sequence may be a repeated version of the RNTI or cell ID bit sequence. The sequence of RNTI bits may be manipulated so as not to undo the CRC descrambling. The manipulation may include reversing or permuting the sequence.

LTE Decoder

The LTE decoder 250 includes a demodulation and layer demapping module 255 which takes the received bit sequence output from the resource element demapping module 215 and converts them into a demodulated symbol sequence. The symbol sequence can be demodulated using a variety of methods such as zero forcing, Minimum Mean Squared Error (MMSE), and Maximum Likelihood Detection (MLD) but is dependent on the scheme used at the layer mapping module 180 and precoding module 185 used at the encoder 100 (shown in FIG. 1). The output of the demodulation and layer demapping module 255 is a demodulated bit sequence which is then passed to the channel decoding module 260.

The channel decoding module 260 then decodes the demodulated bit sequence provided by the demodulation and layer demapping module 255. The decoder implementation depends on the coding scheme used at the channel coding module 170 at the LTE encoder 150 (shown in FIG. 1). The channel decoding module 260 outputs a channel decoded bit sequence for use with the CRC descrambling module 265.

The CRC descrambling module 265 takes the CRC bits of the channel decoded bit sequence output from the channel decoding module 260 and performs a bitwise modulo-2 summation with a first predetermined sequence. Preferably, the same sequence used at the transmitter (FIG. 1) should be used at the receiver (FIG. 2). The CRC descrambling module 265 then outputs a DCI bit sequence such that the DCI format is detected at the DCI format detection module 270.

Figure 3:
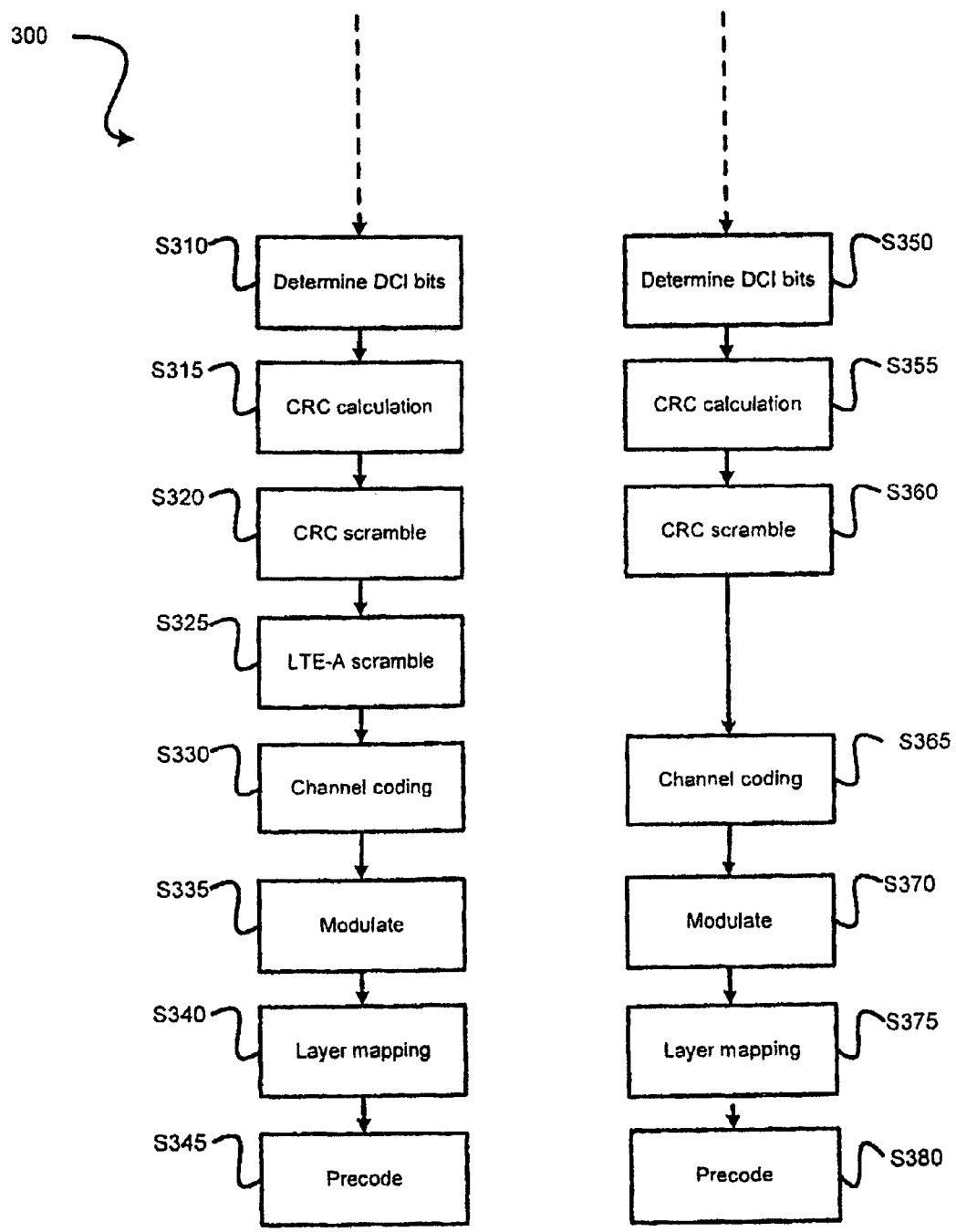
FIG. 3 is a flow diagram showing the steps in the encoding method of the invention.

FIG. 3 shows the method 300 carried out by each of the modules in the PDCCH encoder 100 of FIG. 1 for encoding a bit sequence over a Physical Downlink Control Channel (PDCCH) having Downlink Control Information (DCI). Prior signalling between the transmitter (basestation) and receiver (UE) determine if the DCI format is either LTE- or LTE-A.

LTE-A Encoding Method

In the event that the DCI format is LTE-A, control moves to step 310, where the DCI bits are determined to provide a DCI bit sequence. This step assembles a string of bits that carries information required by the receiver for proper demodulation. The DCI format for LTE-A contains information regarding resource block assignment, HARQ information, modulation and coding schemes, power control information, uplink resource allocation, precoding information, random access information, paging information, multipoint transmission modes, relaying information and any other new features that may be included in future LTE-A systems. This step outputs a DCI bit sequence denoted $a_i$, of length D where the index i ranges from 0 to D−1.

Control then moves to step 315 where a CRC calculation is performed on the DCI bit sequence from step 310 to provide a CRC parity bit sequence. This step calculates the cyclic redundancy check (CRC) parity bits that are used by the receiver (FIG. 2 and FIG. 4) to determine if all the bits have been accurately detected. The current CRC method used in LTE systems can be used. Alternatively, other CRC polynomials can be used. This step outputs a CRC parity bit sequence denoted $p_l$, has a length of L bits and whose index l ranges from 0 to L−1.

Control moves to step 320 where the CRC parity bit sequence (from step 315) is scrambled to provide a scrambled CRC sequence. This step takes the CRC parity bit sequence produced by step 315 and performs a bitwise modulo-2 summation with a first predetermined sequence (i.e. it performs a bitwise XOR operation on the sequence). This may expressed by the following formula $b_l=(p_l+x_l) \mod 2$ l=0, 1, ..., L−1 where x is the first predetermined sequence.

The first predetermined sequence may be the same as used in LTE systems, where the RNTI sequence of 16 bits is used. Alternatively, other sequences may be used provided that they have the same bit length as the CRC parity bit sequence in step 315.

At step 320, the CRC parity bit sequence is also concatenated with the DCI bit sequence from step 310 which results in a scrambled CRC bit sequence which may be denoted by $c_k$ which is given by:

$$c_k = \begin{cases} a_k & \text{for } k = 0, 1, 2, \ldots, D-1 \\ b_k & \text{for } k = D, D+1, \ldots, D+L \end{cases}$$

where the length of c is denoted by K=D+L.

At step 325, the CRC bit sequence produced by step 320 is further scrambled to provide a LTE-A scrambled bit sequence. In particular, the CRC bit sequence c is scrambled again with a second predetermined sequence y. Any predetermined sequence can be used provided that the length of the second predetermined sequence, y is equal to K (the total number of bits). One possible sequence may be a repeated version of the RNTI or cell ID bit sequence. For example if D=32 and L=16, and the RNTI sequence is 16 bits, then y=[x,x,x], where the notation [a, b, c] denotes the concatenation of the arrays a, b and c. If the RNTI sequence is used, the sequence of bits should be manipulated so as not to undo the scrambling of the first stage. Possible methods for this include reversing or permuting the sequence.

Once the LTE-A scrambled bit sequence has been calculated, control moves to step 330 where channel coding of the LTE-A scrambled bit sequence occurs to provide a channel coded bit sequence. Even though this is an LTE-A system, LTE channel coding can be used. Advantageously, re-use of LTE channel coding components results in lower hardware complexity. Alternatively, other coding schemes may also be used including (but not limited to): Turbo, convolutional codes (with different polynomials), Reed-Solomon, block codes etc.

At step 335, the channel coded bit sequence is modulated by converting the channel coded bit sequence into complex values in order to provide a modulated symbol sequence as output for step 340. Modulation schemes such as BPSK, QPSK, 16QAM or 64QAM can be used. Preferably, the LTE modulation scheme of QPSK is used.

At step 340, the modulated bit sequence is layer mapped to one or more antennas associated with a transmitter to provide one or more layers having a bit sequence.

Figure 4:
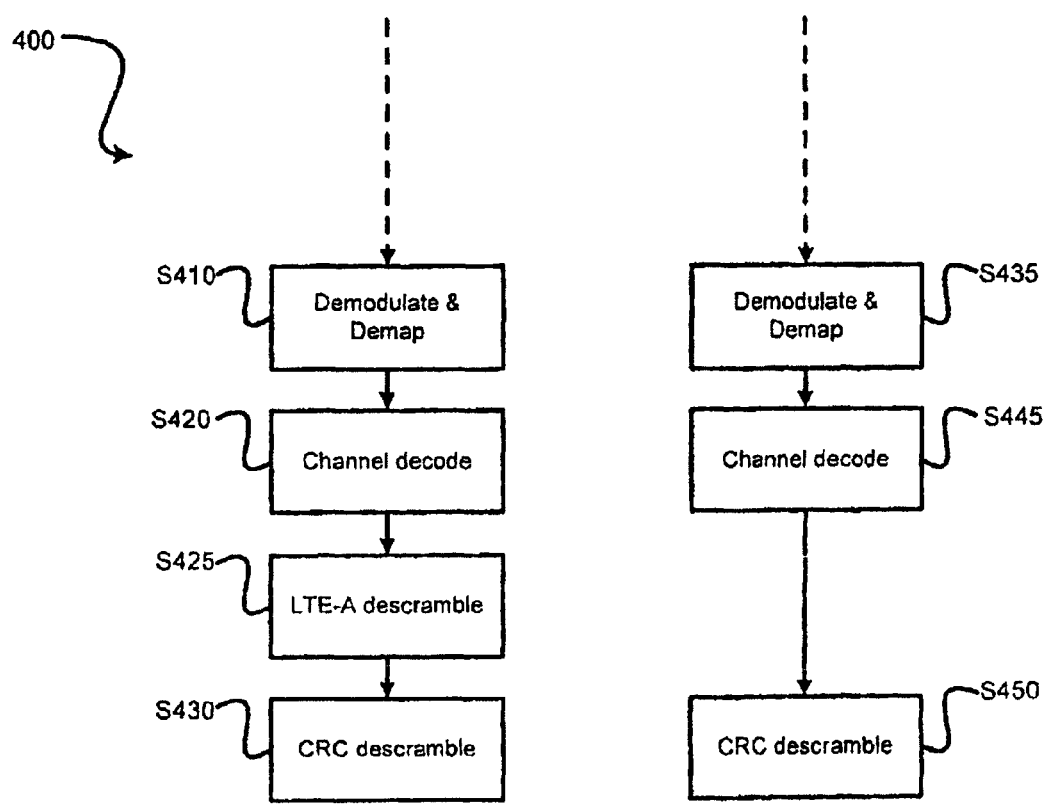
FIG. 4 is a flow diagram showing the steps in the decoding method of the invention.

Finally, at step 345, the layered bit sequences are precoded such that each layer of bit sequences are modified in a specified way. Preferably the precoding should comply with the LTE-A specification where possible. Methods such as space frequency block coding or any form of precoding can be used. The bit sequences for the LTE-A systems are then encoded and ready for decoding at the user equipment via the PDCCH decoder (FIG. 2) and method (FIG. 4).

LTE Encoding Method

Alternatively, at step 305, in the event that the DCI format is LTE, control moves to step 350 where the same steps are carried out as in the LTE-A case, except the step of LTE-A scrambling is not carried out. In particular, steps 350, 355, 360, 365, 370, 375 and 380 correspond to steps 310, 315, 320, 325, 335, 340 and 345. At step 350, the DCI bits are determined to provide a DCI bit sequence. This step assembles a string of bits that carries information required by the receiver for proper demodulation. The DCI format for LTE contains information regarding resource block assignment, HARQ information, modulation and coding schemes, power control information, uplink resource allocation, precoding information, random access information and paging information only. This step outputs a DCI bit sequence denoted by denoted $a_i$, of length D where the index i ranges from 0 to D−1.

Control then moves to step 355 where a CRC calculation is performed on the DCI bit sequence from step 350 to provide a CRC parity bit sequence. Control moves to step 360 where the CRC parity bit sequence (from step 355) is scrambled to provide a scrambled CRC sequence.

Once the scrambled CRC sequence has been calculated, control moves to step 365 where channel coding of the scrambled CRC sequence occurs to provide a channel coded bit sequence.

At step 370, the channel coded bit sequence is modulated by converting the channel coded bit sequence into complex values in order to provide a modulated symbol sequence as output for step 375.

At step 375, the modulated symbol sequence is layer mapped to one or more antennas associated with a transmitter to provide one or more layers having a bit sequence.

Finally, at step 380, the layered bit sequences are precoded such that each layer of bit sequences are modified in a specified way. Preferably the precoding should comply with the LTE specification. The bit sequences for the LTE systems are then encoded and ready for decoding at the user equipment via the PDCCH decoder (FIG. 2) and method (FIG. 4).

FIG. 4 shows the method 400 carried out by each of the modules in the PDCCH decoder 200 of FIG. 2 for decoding a bit sequence over a Physical Downlink Control Channel (PDCCH) having Downlink Control Information (DCI). At step 405 it is determined if the bit sequence is either LTE or LTE-A. Prior signalling between the transmitter (basestation) and receiver (UE) determine if the bit sequence is either LTE- or LTE-A.

LTE-A Decoding Method

In the event that the bit sequence is LTE-A, control moves to step 410, where the received symbol sequence is demodulated and demapped to provide a demodulated bit sequence. The received symbol sequence may be demodulated using a variety of methods such as zero forcing, MMSE, and Maximum likelihood detection but is dependent on layer mapping and precoding scheme used (e.g. FIG. 3). Step 410 outputs a demodulated bit sequence which is used at step 420. Step 420 performs channel decoding on the demodulated bit sequence to provide a channel decoded bit sequence. The type of channel decoding depends on the coding scheme used at the transmitter (e.g. FIG. 3). Advantageously, if the LTE encoder was used, then the same decoder can be used for LTE-A.

Control then moves to step 425 where the channel decoded bit sequence from step 420 is descrambled to provide a LTE-A descrambled bit sequence. The same modulo 2 addition used in the scrambling function of the encoding method (FIG. 3) is used together with the same sequence. Finally, at step 430 the CRC bits of the LTE-A descrambled bit sequence is further descrambled via CRC descrambling to provide a DCI bit sequence such that the DCI format is detected. The CRC descrambling is also performed using the same sequence that was used at the encoder (FIG. 3).

LTE Decoding Method

Alternatively, at step 405, in the event that the bit sequence is LTE, control moves to step 435 where the same steps are carried out as in the LTE-A case, except the step of LTE-A descrambling is not carried out. In particular, steps 410, 415, 420 and 430 correspond to steps 435, 440, 445 and 450.

At step 435, the received symbol sequence is demodulated and demapped to provide a demodulated bit sequence. The bit sequence may be demodulated using a variety of methods but is dependent on layer mapping and precoding scheme used in the encoder (e.g. FIG. 3). Step 435 outputs a demodulated symbol sequence which is used at step 445. Step 445 performs channel decoding on the demodulated bit sequence to provide a channel decoded bit sequence. The type of channel decoding depends on the coding scheme used at the transmitter (e.g. FIG. 3). Control then moves to step 450 where the CRC bits of the channel decoded bit sequence from step 445 is descrambled via CRC descrambling to provide a DCI bit sequence such that the DCI format is detected. The CRC descrambling is also performed using the same sequence that was used at the encoder (FIG. 3).

The invention is:

1. A method of encoding a bit sequence over a Physical Downlink Control Channel (PDCCH) having Downlink Control Information (DCI) including:
   (a) determining DCI bits to provide a DCI bit sequence;
   (b) performing a CRC calculation on the DCI bit sequence to provide a CRC parity bit sequence;
   (c) scrambling the CRC parity bit sequence to provide a scrambled CRC bit sequence;
   (d) if the DCI format is LTE-A, further scrambling the DCI together with the attached scrambled CRC bit sequence to provide a LTE-A scrambled bit sequence;
   (e) channel coding either the DCI attached scrambled CRC bit sequence or LTE-A scrambled bit sequence to provide a channel coded bit sequence;
   (f) modulating the channel coded bit sequence to provide a modulated symbol sequence;
   (g) layer mapping the modulated symbol sequence to one or more antennas associated with a transmitter to provide one or more layers having a symbol sequence; and
   (h) precoding the layered symbol sequences.

2. The method of claim 1, wherein the DCI bit sequence is represented by $\alpha_i$, of length D here the index i ranges from 0 to D−1.

3. The method of claim 1, wherein the CRC parity bit sequence is represented by $p_1$, which has a length of L bits and whose index l ranges from 0 to L−1.

4. The method of claim 3, wherein scrambling the CRC parity bit sequence includes:
   (a) performing a bitwise modulo-2 summation on the CRC parity bit sequence with a first predetermined sequence; and
   (b) concatenating the CRC parity bit sequence with the DCI bit sequence to provide the scrambled CRC bit sequence.

5. The method of claim 4, wherein the modulo two summation is a bitwise XOR operation on the CRC parity bit sequence given by the expression:

$b_l=(p_l+x_l) \bmod 2$ $l=0,1,\ldots,L-1$ where x is the first predetermined sequence.

6. The method of claim 5, wherein the first predetermined sequence is the Radio Network Temporary Identifier (RNTI) sequence of 16 bits.

7. The method of claim 5, wherein the first predetermined sequence is any sequence having the same bit length as the CRC parity bit sequence.

8. The method of claim 4, wherein at step (b) the scrambled CRC bit sequence is denoted $c_k$ which is given by:

$$c_k = \begin{cases} a_k & \text{for } k = 0, 1, 2, \ldots, D-1 \\ b_k & \text{for } k = D, D+1, \ldots, D+L \end{cases}$$

and where the length of c is denoted by K=D+L.

9. The method of claim 1, wherein at step (d), the further scrambling is performed by scrambling the scrambled CRC bit sequence with a second predetermined sequence to provide the LTE-A scrambled bit sequence.

10. The method of claim 9, wherein the second predetermined sequence is equal to the total number of bits K.

11. The method of claim 10, wherein the second predetermined sequence is a repeated version of the RNTI or cell ID bit sequence.

12. The method of claim 11, wherein the sequence of RNTI bits is manipulated so as not to undo the scrambling of the CRC parity bit sequence.

13. The method of claim 12, wherein the manipulation includes reversing or permuting the sequence.

14. The method of claim 1, wherein at step (h), the precoding complies with the LTE-A specification when available.

15. An encoder for encoding a bit sequence over a Physical Downlink Control Channel (PDCCH) having Downlink Control Information (DCI) including:
   a DCI bit module for providing a DCI bit sequence;
   a CRC calculation module for computing a CRC calculation on the DCI bit sequence to provide a CRC parity bit sequence;
   a CRC scramble module for scrambling the CRC parity bit sequence to provide a scrambled CRC sequence;
   an LTE-A bit scrambler module for further scrambling the scrambled CRC bit sequence to provide a LTE-A scrambled bit sequence if the DCI bit module determined the DCI format to be LTE-A;
   a channel coding module for further channel encoding the scrambled CRC bit sequence or LTE-A scrambled bit sequence to provide a channel coded bit sequence;
   a modulation module for modulating the channel coded symbol sequence to provide a modulated symbol sequence;
   a layer mapping module for modulating the symbol sequence to one or more antennas associated with a transmitter to provide one or more layers having a symbol sequence; and
   a precoding module for precoding the layered symbol sequences.

16. A decoder for decoding an encoded bit sequence including:
   a demodulation and demapping module for demodulating and demapping the received symbol sequence to provide a demodulated bit sequence;
   a channel decoding module for channel decoding the demapped bit sequence to provide a channel decoded bit sequence;
   a LTE-A descrambler module to descrambling the channel decoded bit sequence and provide a LTE-A descrambled bit sequence if the bit sequence is an LTE-A sequence;
   a CRC descrambler module for CRC descrambling either the LTE-A descrambled bit sequence or channel decoded bit sequence to provide a DCI bit sequence such that the DCI format is detected.

\* \* \* \* \*

UNITED STATES PATENT AND TRADEMARK OFFICE
CERTIFICATE OF CORRECTION

| | | |
|---|---|---|
| PATENT NO. | : 8,458,559 B2 | Page 1 of 1 |
| APPLICATION NO. | : 13/125463 | |
| DATED | : June 4, 2013 | |
| INVENTOR(S) | : Jiun Siew et al. | |

It is certified that error appears in the above-identified patent and that said Letters Patent is hereby corrected as shown below:

In the Specification

Column 4, Line 62: Delete "(HARD)" and insert -- (HARQ) --

Column 7, Line 12: Delete "(HARD)" and insert -- (HARQ) --

In the Claims

Column 12, Line 52: In Claim 2, delete "$\alpha_i$," and insert -- $a_i$, --

Column 12, Line 52: In Claim 2, delete "here" and insert -- where --

Column 12, Line 55: In Claim 3, delete "$p_1$" and insert -- $p_l$ --

Signed and Sealed this
Twenty-first Day of October, 2014

Michelle K. Lee
*Deputy Director of the United States Patent and Trademark Office*